United States Patent [19]

Blackburn

[11] Patent Number: 5,000,402

[45] Date of Patent: Mar. 19, 1991

[54] KITE ILLUMINATION SYSTEM

[76] Inventor: Thomas E. Blackburn, 4425 82nd St. #2218, Lubbock, Tex. 79424

[21] Appl. No.: 471,939

[22] Filed: Jan. 29, 1990

[51] Int. Cl.[5] ........................ A63H 27/08; B64C 31/06

[52] U.S. Cl. ............................ 244/153 R; 244/155 R

[58] Field of Search ........... 244/153 R, 155 R, 153 A, 244/154, 155 A; 446/44, 45, 219; 362/802, 253; 40/214; 116/202; 340/440, 945, 946, 974, 975

[56] References Cited

U.S. PATENT DOCUMENTS

| | | | |
|---|---|---|---|
| 800,926 | 10/1905 | Mahony | 244/155 R X |
| 800,927 | 10/1905 | Mahony | 244/155 R X |
| 1,326,434 | 12/1919 | Bergher | 244/155 R |
| 2,494,430 | 1/1950 | Carnwath | 244/153 A |
| 2,632,614 | 3/1953 | Bodell | 244/153 R |
| 2,750,136 | 6/1956 | Stracke | 244/155 R |
| 4,715,564 | 12/1987 | Kinn et al. | 244/155 R X |
| 4,768,739 | 9/1988 | Schnee | 244/153 R X |
| 4,841,155 | 6/1989 | Ushida et al. | 250/462.1 X |

FOREIGN PATENT DOCUMENTS

| | | | |
|---|---|---|---|
| 320411 | 12/1917 | Fed. Rep. of Germany | 244/153 R |

*Primary Examiner*—Joseph F. Peters, Jr.
*Assistant Examiner*—James M. Kannofsky
*Attorney, Agent, or Firm*—Richard C. Litman

[57] ABSTRACT

Kite illuminators for night use each have an electric lamp, battery, and mercury switch to control the lamp. The switches respond to both gravity and kite acceleration (or to wind). The lamps light in response to kite motions or tilts. This conserves batteries and also conveys information to the user about the attitude and motions of the kite. Illuminators are mounted on the kite frame or clipped to rings permanently fastened to the kite string, and may be unclipped for day use. Phosphorescent materials are used, as on the rings, to augment and retain the light from the lamps. One illuminator is string-mounted to shine on the kite surface, and flashes upon jerking of the kite string. A two-bulb kite-mounted illuminator lights on one side or the other depending upon the attitude of the kite to the vertical. A tail illuminator responds to motions of the tail to flash. Additional string-mounted units shine on phosphorescent streamers. The four types together form a kite illumination system.

12 Claims, 2 Drawing Sheets

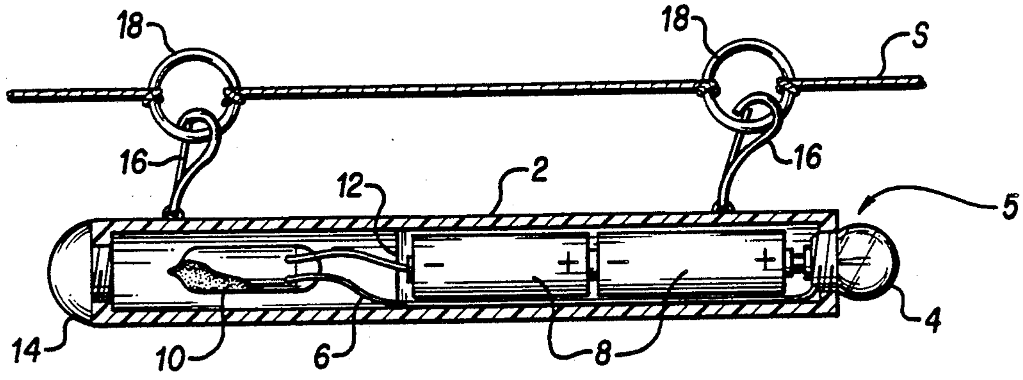
FIG. 1
FIG. 2
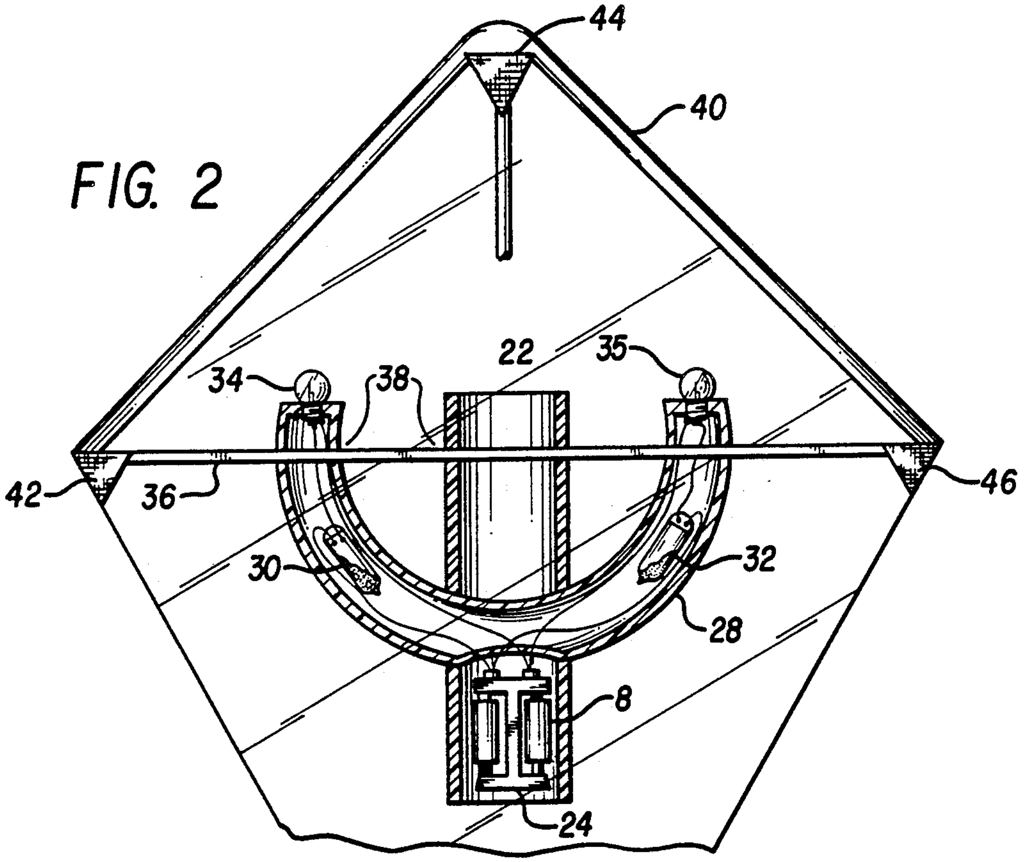

KITE ILLUMINATION SYSTEM

FIELD OF THE INVENTION

The present invention relates to electric lamp systems for lighting a kite at night.

DESCRIPTION OF THE RELATED ART

Since an unlighted kite is invisible at night, lamps and lights have been fitted to kites for night flying.

Kites are flown at night both for recreation and other uses. Mahony, in U.S. Pat. Nos. 800,926 and 800,927, shows a lamp attached to a ship rescue kite for night use. U.S. Pat. No. 1,326,434 of Bergher discloses the use of signal lamps and searchlights on a military kite.

For recreational use, a simple light can give an idea of the elevation of the kite if the user notes the angle of the light from the horizon and knows the amount of string out to the kite. A lamp powerful enough to illuminate the kite body and make it visible from the ground can show the distance of the kite directly by the apparent size; such a lamp also shows the attitude of the kite, as can a less powerful set of lights which are arranged in an asymmetrical pattern.

Information about the attitude or orientation of the kite is important in kite flying, as kites will tend to move to and fro as the attitude changes. To keep the kite aloft often requires tugs on the string, or adjustments in the case of multi-string kites. No kite illuminators in the prior art have the ability to convey information about the attitude of a kite at night.

Lamps may be mounted to a kite in various ways. A lamp may mount to the kite frame, or to the string, or the tail. The lamp may be designed to be seen directly, or, it may shine onto some part of the kite and illuminate it. For example, U.S. Pat. No. 2,632,614 of Bodell discloses a "flying saucer" kite illuminated on its underside by an incandescent bulb mounted on the saucer frame.

A kite illumination system must not only be designed for visibility while the kite is aloft, but it must also be designed for safety, convenience, appearance and low weight. A heavy illumination system will prevent the kite from performing well.

Any lamp which illuminates a kite may be augmented by phosphorescent materials on the kite which glow upon exposure to light from the lamp. These materials, for maximum efficiency, should be close to the lamp. Phosphorescent materials for a kite cover sheet are disclosed by Kinn et al. in U.S. Pat. No. 4,715,564. The cover sheet as a phosphorescent area suffers from the drawback that, as it is a planar element, it is difficult to illuminate brightly.

Prior art designs using phosphorescent materials do not disclose the use of ultraviolet lamps to illuminate those materials. Since ultraviolet light is more efficient than visible light in exciting some phosphors, this omission reflects a lack of optical energy efficiency.

One type of lamp, also disclosed by Kinn et al. as a kite illuminator, is the chemiluminescent type having a translucent bendable plastic outer housing containing a first chemical, and a breakable glass inner tube containing a second chemical. When the inner tube is broken by bending the outer housing, the two chemicals mix and react to produce light.

While the chemiluminescent lamps are safe and light enough in weight for use with a kite, they have some drawbacks. They are fairly expensive, not reusable, and not readily available. Such lamps are hard to adapt to day use. Kinn et al. employ the housing as a kite brace or frame member.

Carnworth, in U.S. Pat. No. 2,494,430, shows electric lamps driven by a generator turned by a rotating kite. This system suffers from the great weight, expense, and unreliability of the generator.

Small batteries carried on the kite have also been used to power electric lamps. Since the voltages are usually low, no danger is present. Reliability can be made quite good. However, there is a tradeoff between lamp brightness and system weight, because batteries with large ampere-hour ratings are heavy. Thus, if weight is kept down by using small batteries, then either lamp brightness is limited or the lamps will only stay lit for a short time.

Wires from a large ground battery could be run up to an electric lamp on the kite, but the two wires needed would be expensive, stiff, heavy and prone to kinking and breakage, and would require slip rings if the wires were stored in the usual way on a rotating spool. Such remote power wires combined with a switch would allow the lamps to be turned off and on at will to conserve battery power (although there would be little motive to do so, since the battery could be arbitrarily large).

A failing of all the electric kite illuminators shown in the prior art, which carry batteries at the kite, is that none makes use of the ability of an electric lamp to be easily turned on and off by means of a switch. If the electric lamps at the kite could be flashed remotely at will, or be arranged to flash in response to motions of the kite or wind gusts, the user could conserve battery energy and light the kite only when desired. It would be useful if the kite or some parts of it could remain glowing, for continued visibility, after these flashes of light.

SUMMARY OF THE INVENTION

One object of the present invention is a kite illumination system, comprising kite illuminators, which is safe in use, inexpensive to manufacture and use, and attractive in appearance.

An additional object is a kite illuminator which is easy to remove from a kite or kite string for daytime use.

A further object is a kite illumination system which need not be built into a kite and which can be easily retrofitted to an existing kite.

Another object is a kite illuminator, using battery-powered electric lamps, which has both bright lamps, low weight, and long battery life in use, and provides the most extended illumination for the weight lifted.

Another object is a kite illuminator with easily replaced electric bulbs and batteries.

A further object is a kite illumination system which conveys information to the kite user about the attitude and motions of the kite, so that the user may appropriately respond to wind changes and the kite may be flown at night.

An additional object is a kite illuminator which will provide enjoyable light show effects for users as lamps respond to motions of the kite or to gusts of wind.

Another object is a kite illuminator which can be made to flash by manipulating the kite string.

A still further object is a kite illuminator which will respond to the erratic motion of a kite tail in the wind by flashing.

Still another object is a kite illuminator which augments the light from electric lamps with phosphorescent objects close to the lamps.

A final object is a kite illuminator using ultraviolet lamps to illuminate phosphorescent materials on a kite.

According, the present invention is a kite illumination system comprising illuminators each having a housing, electric lamps, batteries, and wires, and each having attachments to a kite, kite string, or tail. The invention uses electric switches to open and close the circuit between the batteries and lamps, thus making the operation of the lamps intermittent. The switches are preferably of the "gravity" type: for example, mercury switches which respond to the direction of net acceleration, including gravity. The accelerated motion of the kite, and its attitude to the vertical, combine to determine the on/off states of the switches.

The control of the lamps by the gravity switches thus not only conserves the battery power but also gives the user information about the attitude and motion of the kite.

In one embodiment of the kite illuminator the housing is a cylindrical tube attached by snaps to rings tied into the kite string near the kite proper. The housing is free to swing from the rings. At the end of the housing toward the kite is a lamp bulb to illuminate the kite. The batteries and mercury switch are inside the housing. The switch is set into the housing so that it is normally closed. The lamp can be flashed by jerking the string, which causes the housing and mercury switch to swing back and forth. Phosphorescent material can be used on the kite or rings.

In another embodiment, two lamps are mounted in back of the kite. Each is controlled by its own switch. The switches are angled to either side of the centerline of the kite. Thus, the lamp on either side will light when the kite tilts toward that side.

A third embodiment is a sphere, tied to the kite tail. Motion of the tail causes the lamp to flash.

A fourth embodiment is similar to the first but smaller. Rather than shining on the kite, the lamp shines on a phosphorescent streamer tied to a ring interposed on the string.

BRIEF DESCRIPTION OF THE DRAWINGS

FIG. 1 is a cross-sectional view of the kite front illuminator embodiment.

FIG. 2 shows the kite back illuminator embodiment in cross section.

Similar reference characters denote corresponding parts throughout the several figures of the drawings, except in the case of lamp bulbs 4 of FIG. 1 and 34 and 36 of FIG. 3, which are not necessarily of different types. Different numbers were used here to denote bulbs in differing positions.

DESCRIPTION OF THE PREFERRED EMBODIMENTS

Figure 4:
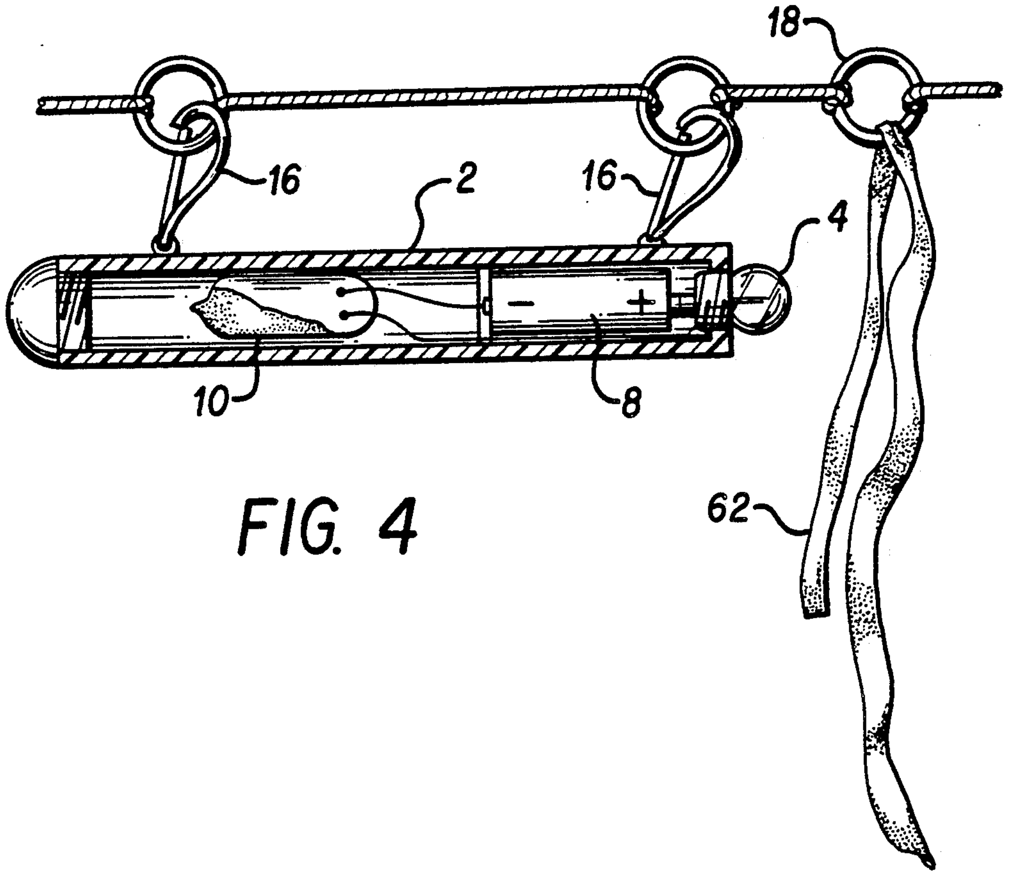
FIG. 4 shows a kite string streamer illuminator.

The present invention consists of three embodiments of the kite illuminator and one streamer illuminator, all of which are separate and independent, but which may be used in conjunction. Each serves a particular purpose. Together the four constitute a complete kite illumination system.

All these preferred embodiments share the use of an incandescent lamp or lamps, battery or batteries, and a mercury switches connected by wires in simple series circuits so that the closing of the mercury switch lights the lamp. Thus the lamps respond to both the direction of gravity and to the direction and amount of acceleration in the motions of the kite in air.

Besides mercury switches, other switches responsive to acceleration may be employed, such as for example, roller ball switches. Pull chain switches can also be used; or pressure switches can be used to respond directly to the wind pressure. (The third embodiment, kite tail-mounted, responds to wind gusts, which sway the kite tail, even if a mercury switch rather than a wind pressure switch is employed.)

The first embodiment, a kite front illuminator, is shown in FIG. 1., mounted on the kite string S at a point about two feet from the kite face. A generally tubular housing 2 is constructed of light-weight plastic with a diameter of about one-half inch. An incandescent electric lamp bulb 4 is mounted at the forward end of the housing (toward the kite) which end is provided with screw threads to mate with the threads on the lamp bulb. The lamp socket 5 has soldered to it a ground wire 6 which runs inside the housing 2 past the batteries 8 to a mercury switch 10. The batteries 8 are held in position by an internal metal battery brace 12 which serves both as a battery locator and negative terminal contact. The electric circuit is completed by the contact of the positive battery terminal to the end of the bulb.

An end cap 14 screws into the end opposite the lamp to close the housing tube against the elements.

Snaps (clips, spring hooks) 16 are attached to the housing 2 as shown, and are free to swivel or rotate relative to the housing. The snaps hook onto rings 18 which are tied into the kite string. They are constructed of light-weight plastic.

In operation, the mercury switch is normally open, as the kite string tilts upward from the ground toward the kite. As shown in FIG. 1, the mercury in this attitude is away from the contacts. If the string is suddenly jerked or pulled toward the kite user, the housing and mercury switch are pulled back as well, and the mercury momentarily covers the contacts, closing the switch. The lamp flashes, illuminating the kite. Thus, the user can cause a flash and thereby see the kite at will.

For continued and augmented visibility, the kite can be coated with a phosphorescent material which will glow after the flash of light from the lamp. Also, the rings can be made of phosphorescent material or coated with phosphorescent paint. Because of the proximity of the rings to the lamp, their phosphorescent material will respond more strongly than will material on the kite.

The use of phosphorescent materials is more efficacious with intermittent lamps, as in the instant invention, than such use is with constantly-lit lamps, as in the prior art. The phophor light remains visible between lamp flashes without continuous power drain, thus providing continuous kite visibility over periods of time without the use of heavy batteries.

The second embodiment is mounted on the back of the kite (on the side away from the user). It is shown in FIG. 2. The housing consists in part of a large straight tubular section 22 containing a battery holder 24 and two batteries 8. The holder 24 is of the type having springs to make electrical contact and securely hold the batteries from falling out.

Passing through an aperture in the large straight tube 22 is a smaller diameter curved tubular member 28. Inside this tube are wires from the batteries and the mercury switches 30 and 32. Lamp bulbs 34 and 35 are screwed into threaded ends.

Wires power the lamps in parallel from the battery pack. The batteries are in series. The wiring, which is soldered to the bulbs and mercury switches, is such that mercury witch 30 controls bulb 34, and switch 32 controls bulb 35. If the kite tilts (rolls) so that lamp 34 is down, then mercury switch 30 closes and lamp 34 lights. If the kite tilts the other way then lamp 35 will light.

The housing is located to the kite in this manner: the kite crossbrace or frame member 36 passes through six holes 38 in the large and small tubes. The cut of the cross section in FIG. 2 is at the level of these holes.

A strip of phosphorescent material 40 is fastened at three points as shown by velcro tabs 42, 44, 46. This material will glow after being exposed to light from the lamps 34 and 36.

Figure 3:
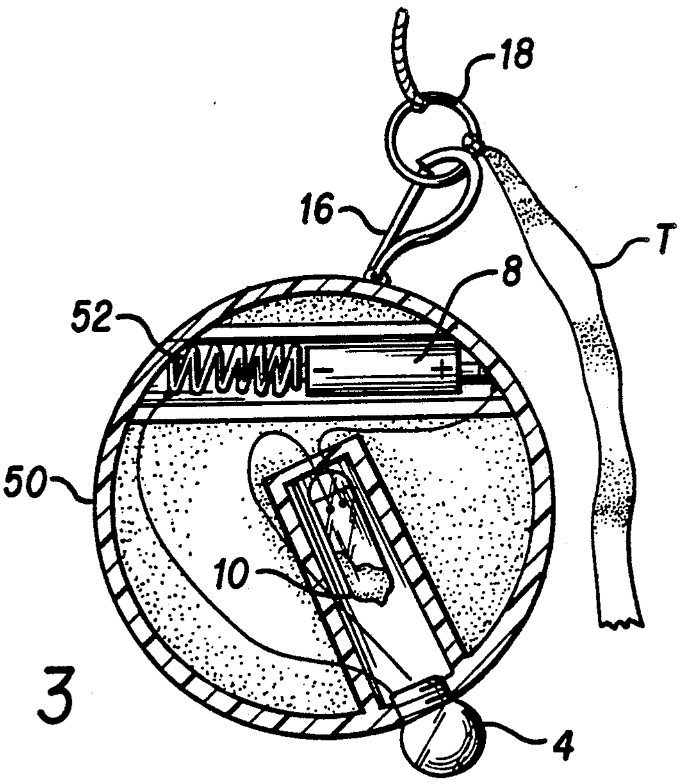
FIG. 3, also a cross section, is a view of the spherical tail bulb embodiment.

FIG. 3 shows the third embodiment of the invention, which is hung from a ring 18 on the kite tail T. The housing in this case is a sphere of transparent plastic 50 with internal moldings to hold the battery and mercury switch. The battery 8 is held by spring 52 which also provides electrical contact. The bulb 4 threads into the housing 50. A mercury switch 10, normally inverted, responds to erratic motion of the kite tail (such as dive by the kite or a tail swing from a gust of wind) by flashing the lamp. The housing 50 is connected by a snap 16 to the ring 18, which may be phosphorescent. Additional phosphorescent material may be coated on the inside of the spherical housing 50 to provide an afterglow. Also, the kite tail T may be phosphorescent.

The fourth embodiment is the kite line illuminator shown in FIG. 4. It is similar to the kite front illuminator of FIG. 1 but smaller and lighter, having only one battery. It is used in conjunction with an auxiliary ring 18 and phosphorescent streamer 62 fastened to this auxiliary ring. One or more of these can be strung along the kite string at various places. The ring 18 may also be phosphorescent.

It to be understood that the present invention is not limited to the sole embodiment described above, but encompasses any and all embodiments within the scope of the following claims. For example, the sizes of components may be scaled to various sizes of kite.

What is claimed as the present invention:

1. In an illuminator system for a kite having a kite string the improvement comprising:
- a housing;
- an electric lamp attached to said housing;
- a battery having terminals disposed within said housing;
- a switch responsive to accleration disposed within said housing;
- wires connecting said battery terminals, said switch, and said lamp, adapted to light said lamp upon acceleration; and
- attachment means for connecting said housing to said kite or kite string; whereby
- said lamp intermittently lights upon acceleration of said housing during movement of said kite.

2. An illuminator system according to claim 1, including a plurality of said lamps activated by said switch.

3. An illuminator system according to claim 2 including a plurality of said switches, whereby said switches are differentially activated by various conditions of acceleration and light said lamps differentially to provide a kite user information about the conditions of the kite.

4. An illuminator system according to claim 3, wherein
- said kite includes a left side and a right side with said housing spanning said sides,
- one said lamp adjacent said kite left side for illuminating the kite;
- another one said lamp adjacent said kite right side for illuminating the kite;
- one said switch disposed at a first angle relative to said housing adapted to light said lamp adjacent said kite left side when the kite is inclined so that the left side of the kite is downward; and
- another one said switch set at a second angle relative to said housing adapted to light said lamp adjacent said kite right side when the kite is inclined so that the right side of the kite is downward.

5. An illuminator system according to claim 4, wherein said housing includes a large straight tube for containing said battery; and
- a curved tube having a midpoint, a left end, and a right end, said curved tube attached to said large straight tube at said midpoint;
- said curved tube having said one and said another one lamps attached respectively to said tube left and right ends,
- said one switch disposed within said curved tube between said midpoint and said left end; and
- said another one switch disposed within said curved tube between said midpoint and said right end.

6. An illuminator system according to claim 1, wherein:
- said housing includes a small straight tube having a front end and a rear end;
- said lamp is mounted at said front end of said small straight tube;
- said attachment means including a front clip rotatably mounted adjacent said front end for attaching said front end to the kite string, and a rear clip rotatably mounted adjacent said rear end for attaching said rear end to the kite string; whereby
- said housing may swing relative to the kite string while remaining generally parallel to the kite string.

7. An illuminator system according to claim 6, including: a front ring for attachment to said front clip;
- a rear ring for attachment to said rear clip;
- said rings disposed along the kite string adjacent the kite, whereby
- said housing is removably attachable to said rings to permit illumination of the kite.

8. An illuminator system according to claim 7, wherein:
- said front ring and said rear ring are phosphorescent.

9. An illuminator system according to claim 1, wherein:
- said kite includes a tail;
- said housing including a transparent spherical shell;
- a clip rotatably mounted on said shell; and
- a ring disposed along said kite tail for attachment of said clip.

10. An illuminator system according to claim 9, including:
- phosphorescent material disposed within said shell.

11. An illuminator system for kites having a kite string comprising:

a housing;

at least one electric lamp attached to said housing;

at least one battery having terminals disposed within said housing;

at least one switch responsive to environmental conditions disposed within said housing;

wires connecting said battery terminals, switch, and lamp and adapted to light said lamp upon closing of said switch; and attachment means for attaching said housing to the kite or kite string; whereby said lamp intermittently lights in response to changing environmental conditions.

12. An illuminator system for kites having a kite string comprising:

a housing;

at least one electric ultraviolet lamp attached to said housing;

at least one battery having terminals disposed within said housing;

at least one switch responsive to acceleration disposed within said housing;

wires connecting said battery terminals, said switch, and said lamp, adapted to light said lamp upon acceleration;

attachment means for attaching said housing to the kite or kite string; and phosphorescent material adjacent said lamp; whereby said lamp intermittently lights upon acceleration of said housing as the kite moves and said phosphorescent material glows.

* * * * *